June 4, 1957  J. D. RIESER  2,794,930

MOTORIZED SPEED CHANGE DEVICE

Filed Jan. 21, 1955  3 Sheets-Sheet 1

INVENTOR.
John D. Rieser
BY John D. Rieser

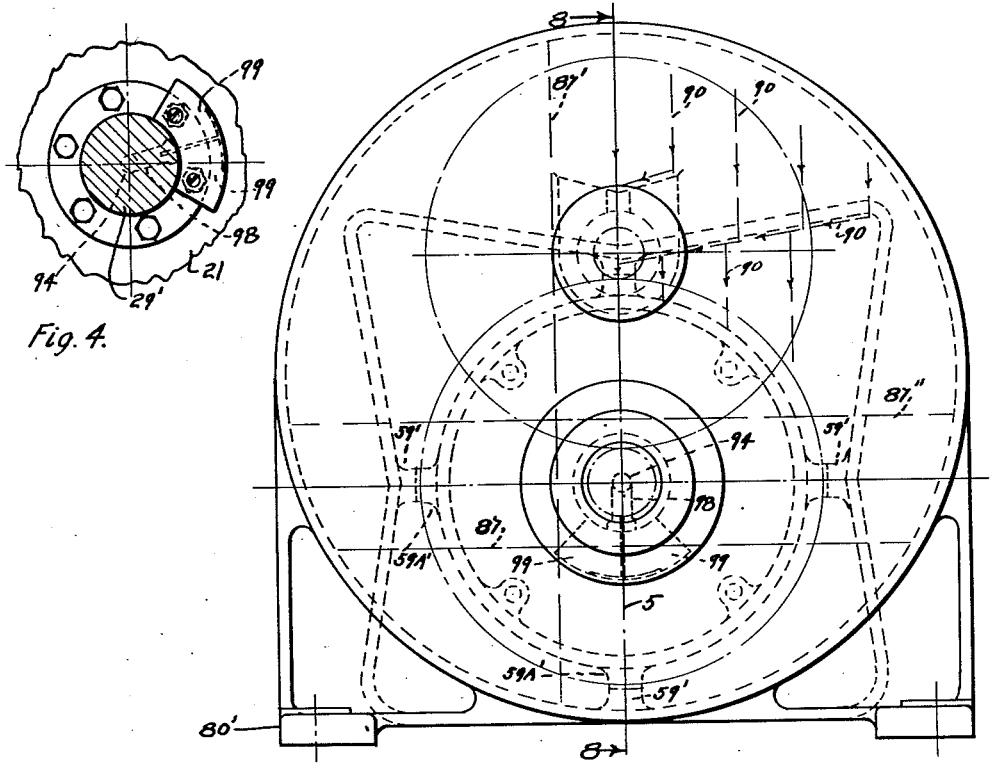

June 4, 1957 J. D. RIESER 2,794,930
MOTORIZED SPEED CHANGE DEVICE
Filed Jan. 21, 1955 3 Sheets-Sheet 3

INVENTOR.
John D. Rieser
BY John D. Rieser

· # United States Patent Office 2,794,930
Patented June 4, 1957

2,794,930

MOTORIZED SPEED CHANGE DEVICE

John D. Rieser, San Francisco, Calif.

Application January 21, 1955, Serial No. 483,275

6 Claims. (Cl. 310—54)

This invention relates to motorized speed change devices of the kind involving an electric motor as the prime mover drivingly coupled to a speed change mechanism and together inclosed within a fluidtight housing and provided with a power takeoff and support means.

Heretofore electric motorized speed change devices, commonly referred to as gearmotors have been made having the end structure of the prime mover stator supportably connected externally onto the housing inclosing the speed change mechanism by means of an adaptor extension or the like that includes ventilating passages for air cooling of the prime mover. Fan means driven by the prime mover being used to circulate the air about the prime mover, to remove the heat generated by the prime mover during its operation. Which consumes power, even tho the speed change apparatus employs splash means to circulate the fluid medium within the housing, to wet interior surfaces therein. All of which produces the inherent objectionable feature of excessive overall length and consequent overhang weight beyond the supports of such devices. For example, motorized speed change devices of the type disclosed in my Patent No. 2,603,983 of July 22, 1952, and my Patent No. 2,640,367 of June 2, 1953.

Electric motors have heretofore been made inclosed, in which air and/or a fluid medium is caused to be circulated both through and externally about its structure to remove the operative heat generated by the motor. Such electric motor devices are used to drive furnace fans and fluid pumps that are coupled directly onto its power output shaft, but they are not inclosed within the housing inclosing the speed change mechanism in the sense so as to employ its splash means of circulating its fluid medium so as to wet external exposed surfaces of the prime mover (motor) and form operably a major medium of transferring said heat from the prime mover to surfaces of said housing.

It is a general broad object of the present invention to provide an improved compact motorized speed change device in which its prime mover is inclosed within a fluidtight housing of the speed change mechanism, so that operably the fluid medium within the housing is caused to wet exposed surfaces of the prime mover and form a major medium of transferring heat from the prime mover to surfaces of said housing.

Another object of the present invention is to provide a motorized speed change device in which its prime mover is inclosed within a fluidtight housing of the speed change mechanism and in which the circuit leadin conduit pipe extends from the prime mover through a hole in the wall of the housing and equipped with a combination closure coupler that forms by single manual operation a seal between said hole and an external perimeter of said conduit pipe without imparing its self-contained breather means.

Another object of the present invention is to provide a motored speed change device equipped with a tubular power takeoff and having a self-alignable support whereby in the bolting means serves the dual purpose of fastening the top half to the bottom half and averts rotation of said device upon operative rotation of said power takeoff.

Another object of the present invention is to provide a motorized speed change device of novel and simplified construction.

Other more specific objects and advantages will appear from the following description of the illustrative embodiment of the present invention.

In the drawings accompanying and forming a part hereof,

Figure 4 is a fragmentary plan view, partly in section, taken on the lines 4—4 of Figure 8, but rotated to a position for the fluid to flow through the motor shaft.

Figure 5 is a fragmentary plan view, taken on the lines 5—5 of Figure 2, with the top half of the self-aligning support removed and the studs shown in place in section.

Figure 6 is an enlarged side view, partly in section of the combined self-vented coupler unit in place forming the combined couple between an opening of the housing and an external portion of the electric motor leadin conduit, a fragmentary portion of the top portion of the housing extension and the leadin conduit being shown.

Figure 9 is a power takeoff end view in the direction of the arrows 9—9 of Figure 8.

Figures 1, 2, 3:
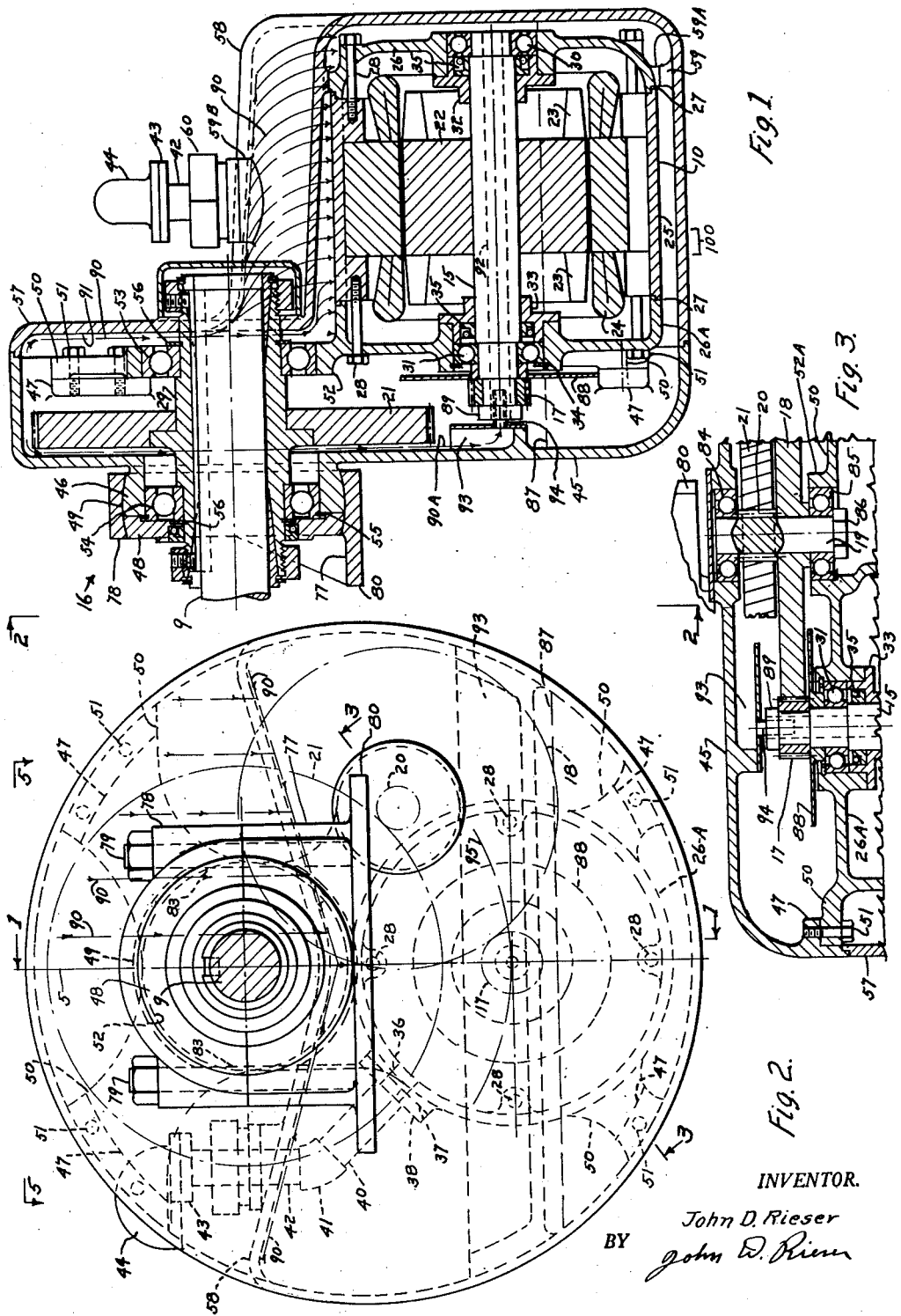
Figure 1 is a side view of my device, partly in section, taken on the lines 1—1 of Figure 2.
Figure 2 is a power takeoff end view, viewing in the direction of arrows 2—2 of Figure 1.
Figure 3 is a fragmentary side view, partly in section, taken on the lines 3—3 of Figure 2.
Figure 8:
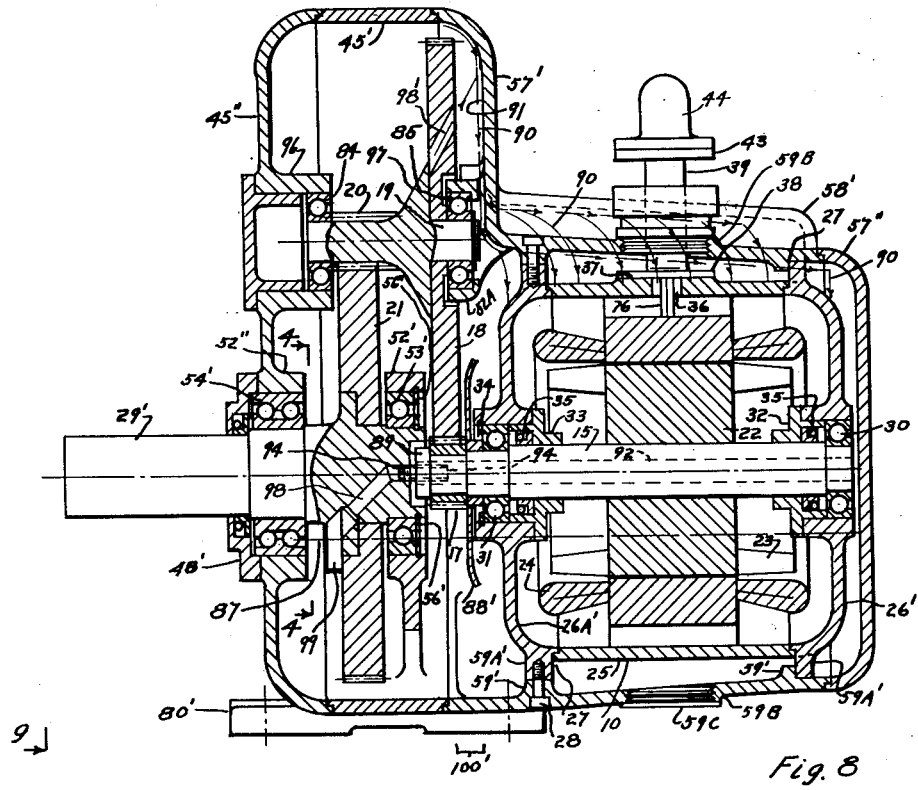
Figure 8 is a side view of a modified embodiment of my invention, partly in section, taken on the lines 8—8 of Figure 9.

In accordance with the objects of this invention to provide a compact motorized speed change device, hereinafter referred to as a device, and referring particularly to Figure 1, the device generally consists of a fluidtight housing 100 having a support means 16, a power takeoff 29 which in this illustration is tubular and fitted for mounting directly and rigidly onto an end portion of the drive shaft of the machinery to be driven, and as its fittings are similar to that of my copending application Ser. No. 372,107, dated August 3, 1953, hereinafter further detail description is omitted. Internally the device includes fluid coolant means 87, a prime mover 10 which consists of an inclosed electric motor having desired electrical characteristics and a power output shaft 15, speed change mechanism drivingly interconnecting the output shaft and the power takeoff and operably the fluid means wetting opposite surfaces of the prime mover to that of the housing. And as shown Figures 1, 2, 5 and 7, the device is mounted about the drive shaft 9 of a driven apparatus. And referring to the Figure 2 the dot and dash line 5, may be read as a vertical center line; altho the prime mover may be positioned anywhere on the arc of a circle 95, scribed from the center of the power takeoff and the dot and dash circles represent the pitch circles of the speed change mechanism within the housing 100.

In the forms shown Figures 1-3 and 8-9 the speed change mechanism includes a double reduction gear set of which the high speed pinion 17 is mounted onto an end portion of the prime mover output shaft 15, and in mesh with the pinion 17 is an intermediate speed gear 18 mounted onto the intermediate speed shaft 19, this shaft 19 also mounts the slow speed pinion 20, that in turn is in mesh with the power takeoff gear 21, that is mounted onto the power takeoff 29, these gears and pinions having suitable driving connections therewith their respective shafts and generally the driving connections are not shown.

The prime mover 10 is of the round frame footless type and is of usual construction, therefore its structure is not here described. The prime mover shaft 15, which is also the input shaft of the device, suitably and drivingly mounts the rotor 22 and the rotor 22 may have the blades 23 projecting from each of its ends. The stator and coils 24 are fastened onto the frame 25 of the prime mover in usual manner. The front end of the frame 25 is fitted to and engages a corresponding fitting thereof the front end bracket 26 so as to form a fluidtight connection between the two as at 27 and held in place by a series of screws 28 (also see Figure 2). And the rear end bracket 26A, fits and engages onto the opposite end of the frame 25 in similar manner. Both the front and rear end brackets having hubs that are bored for supportably mounting the anti-friction bearings 30 and 31 and for the inner shank portion of the caps 32 and 33. The inner end of the shank of the cap 33 and the snap ring 34 anchor the bearing 31 in longitudinal direction, as the caps 32 and 33 are fastened onto the inner face of the hub on each said brackets, the fastenings are not shown. And each of the caps 32 and 33 are bored to mount the positive fluid seals 35 and for the end portions of the shaft 15 to pass therethrough. Then the frame 25 is provided with an opening 36 and a flange face 37 (best seen at the Figures 2 and 8) that readily permits of the leadin wires of the stator coils extending for connection to the electric circuit in usual manner, but not shown. The flange 37 is fitted for screws so as to readily permit of attaching thereto fluidtight of a conduit flange 38, which in turn is threaded internally for the conduit nipple 39 (Figure 8) and 40 Figure 2. And thereof the device Figures 1 and 2, the other end of the nipple 40 is shown with a forty-five degree elbow 41 and a second conduit nipple 42, with a second conduit flange 43 that interengages with a corresponding flange of the one hundred and eighty degree conduit bend 44. The nipple 42 and/or 39 passes through a combination coupler and venting unit hereinafter dwelt with. Thus even tho the external ends of the prime mover shaft bearings 30 and 31 are not sealed, the simple construction described provides an inclosed fluidtight prime mover, that is in turn operably mounted within the housing 100, so as to permit of desired surfaces be wetted, as will be seen.

Referring to the Figures 1–3, 5 and 6, the housing 100 is formed of two parts so as to form a fluidtight inclosure for the desired speed change mechanism and the prime mover. One of the parts is the rear end body portion 45 and the second part is the cover section 57. They are suitably fitted and fastened together to form a single unit. The fastenings are not shown. The body portion 45 has a support element 46, which forms the internal portion of the self-aligning mounting means 16. Externally the element 46 and the attached cap 48 are turned so as to form a spherical portion 49 and internally the body 45 and the flange 47 are bored and faced to form a seat for the flange 50 of the rear end bracket 26A, which in turn is fastened to the body by a series of screws 51. The flange 50 being a radial extension of the rear end bracket 26A, forms a support means for the prime mover within the housing. The flange 50 includes a hub 52, which together with the element 46 are bored for the outer race of the bearings 53 and 54, that in turn form the journaling support for the power takeoff 29. The bearing 54 having a snap ring 55 and together with an inside face of the attached cap 48 prevent the bearing 54 moving in an axial direction, as the power takeoff includes shoulders and snap rings 56 locking the inner race of the bearings 53 and 54 thereto as a unit. The flange 50 also includes a hub 52A, which together with the rear end body portion 45 are bored for the outer race of the bearings 84 and 85, that in turn form the journaling support for the intermediate shaft 19, see Figure 3, of which the nut 86 retains relative position of the bearing 85 and the gear 18 on the shaft 19. The cover 57 is bored to permit of an end portion of the power takeoff extending through an end wall and internally the extension 58 of the cover 57 has a series of bosses 59, two of which are shown that are bored to correspond with a similar series of bosses 59A, disposed externally on the front end bracket 26 and form a centering engagement between the prime mover and the cover portion. Then in line with the opening 36, the extension 58 has a boss 59B, that has internal pipe threads for the threaded shank of the combined coupler unit, see the Figure 6, which shows an enlarged section of the unit in operative position. And its construction is similar to that described thereof my copending application No. 469,968, dated November 19, 1954, now Patent No. 2,738,991, but modified to suit the present application, therefore its detail construction and description is here omitted. And generally the unit provides that by a single manual operation, both the threaded opening in the boss 59B and an external perimeter of 42 or 39 are engaged, sealed and coupled without impairing the operation of the shielded vent or breather, which is a part of the coupler unit and communicates the interior of the housing 100 with the atmosphere for breathing purposes, without the need of providing other vent means of the housing. And now referring to the Figure 6, this coupler is constructed of two metal parts, a body 60, shaped externally for a wrench, a hole 61 at the top to readily permit of the conduit pipe passing therethrough, an inclosed circular vent space 62, and a hollow shank 63, of which the upper portion of the hollow forms seating means for the hollow rubber gland 64, through which the conduit pipe readily passes when in free position. And the lower portion of the hollow shank 63, externally is provided with screw threads to conform with the screw threads therein the boss 59B, and a portion of the length of this shank is slotted as at 65 to permit of the bridge portions 66 of the gland base 67 passing therethrough. The gland base 67 is formed of an inner and outer ring portions 68 and 69, spaced apart so as to form spaces for the shank of the body passing therethrough and being interconnected by two bridge portions 66. The inner ring portion 68 provides a seat for the lower end of the hollow rubber gland and has a hole 70 to permit of the conduit pipe readily passing therethrough. The outer ring portion 69 includes a ring section 71 that in turn, extends into the inclosed circular vent space 62 of the body and this outer ring portion of the gland base also provides a seating face for the bottom gasket 72. The bottom gasket has a hole 73 so that the gasket 72 extends around the shank 63 above its threaded portion. The width of the slots 63 thereof the shank 63 of the body are greater than the width of the bridge portions 66 of the gland base, so as to provide a series of four vents, that when the coupler unit is operably positioned thereof the boss 59B communicates the interior of the housing with the atmosphere, as is indicated by the double arrowed line 74 so as to provide required breather means. And within the circular shielded vent space 62, have shown the inclusion of a filter medium 75 so as to prevent entrance of foreign matter into the housing. The lines 76 indicate the leadin wires of the prime mover extending through the conduit pipe. Now then to show that by single manual operation the coupler unit causes both the threaded opening in the boss 59B and an external perimeter of the conduit pipe are engaged, sealed and coupled, assuming that the coupler unit is in free position with the conduit pipe extending therethrough, in which event the bottom edge of the bottom gasket bears upon the top end of the external threads of the shank and upon the shank being screwed into the boss 59B, causes vertical movement downward of the entire coupler unit toward the top face of the boss 59B, whereupon the bottom surface of the bottom gasket contacts said top face of the boss and as the top face of the bottom gasket is in contact with the bottom face of the outer ring 69 of the gland base, causes same to rise vertically which compresses the rubber gland therein the body, causing the hole in same to contract and grip the external perimeter of the conduit pipe, regardless of commercial variations usually encountered in ordinary commercial conduits, all the while the engagement therebetween the bottom face of the bottom gasket with the top face of the boss, forms the desired closure seal of the hole. All of which by single manual operation provides, tight, drip-proof and fluidtight couple connection at both the housing and the conduit pipe without impairing the vent means.

Now referring to the Figures 1–2, 5 and 7, the self-aligning support 16 also includes a bottom half 77 and a top half 78 that meet at the common axes of the power takeoff 29 and the spherical portion 49 and are fastened together by two studs or bolts 79, similar to that of a common bearing. And internally both the bottom half 77 and the top half 78 are bored spherical to correspond to that of the spherical portion 49 of the support element 46 so as to permit of universal movement between the two. The bottom half 77 includes a base pad 80 similar to that of a bearing and having bolt holes 81 so as to permit of the device being fastened onto a portion of the driven machinery or foundation after initial alignment. Referring to the Figures 2 and 5 and it will be seen that a portion of the length of the shank of the studs 79 pass through the spherical portions 49 and that on one side said shank has bearing within the curve of the stud hole 82 while at the opposite side, has only a line contact bearing upon a straight side of a slot 83 that extends a length equal to that of the length of the stud hole in the element 46, and a width to readily permit of the base 80 being mounted onto an unfinished structure whose mounting surface need not be in alignment with that of the longitudinal axis of the drive shaft of a driven machinery onto which the power takeoff 29 couples directly and rigidly. As the mounting means 16 is self-alignable to accommodate such situations without having to fasten same onto said structure. Then operably upon the base 80 being fastened onto the foundation or machinery portion, the line engagement between the edge of the studs and the support element serves as a simple means to prevent rotation of the device with that of the power takeoff without having to provide other torque resisting means.

Figure 7:
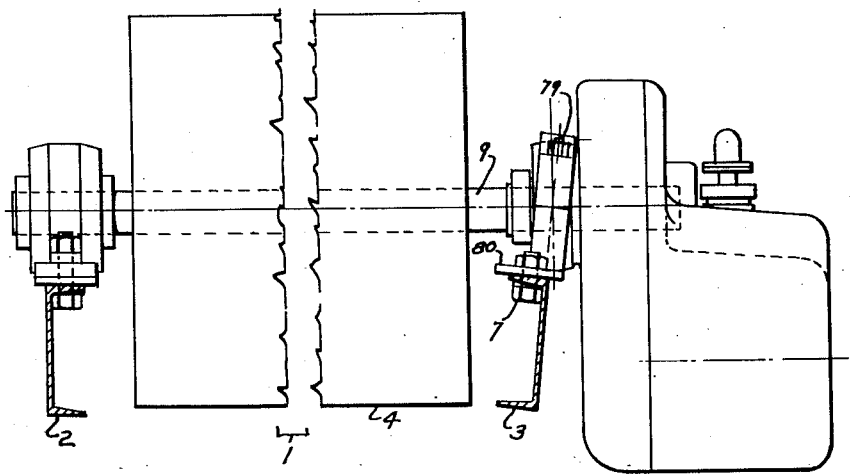
Figure 7 is a section through a conveyor structure at its drive end to show an application of my motorized speed change device onto a driven machine, the application also shows that the device is self-alignable to accommodate situations of misalignments between the mounting face thereof the driven machinery and that of the axes of the driven shaft.

The Figure 7 shows an external side view of the device Figure 1, to reduced size, and with its power takeoff coupled directly and rigidly onto the drive shaft 9 of a driven machinery, generally indicated by the numeral 1, which is the drive end of an ordinary belt conveyor. Of which 2 and 3 are common side stringer channels, and as shown the top flange of the channel 2 mounts the base of an ordinary journal, that in turn journally supports one end of the drive shaft 9, onto which is mounted a conveyor head pulley 4 while the other end of the drive shaft is supportably journaled by the power takeoff 29 journals within the device, that is in turn shown mounted onto the top flange of the channel 3, of which the mounting surface of the flange is not in parallel alignment with that of the longitudinal axis of the drive shaft 9. It is well known that such situations are often encountered in practice when dealing with unfinished structures and of which the device automatically compensates for without upsetting the simple means provided to prevent rotation of the device. For example, in initially installing the device onto the sloping top surface of the channel flange, the weight of the device along with that of the end of the drive shaft, automatically causes the bottom half and top half of the self-aligning support 16 to swivel about the common axes of the power takeoff and the shperical portion of the support element of the device and as mentioned after initially aligning the drive shaft, the holes in the flange for the fastening bolts 7 may be provided, all of which provides desired latitude for installation purposes.

Thereof the Figures 1 and 2, the dash line 87 indicates the level of a desired fluid within the housing 100 and operably to cause the fluid being continuously splashed onto the inside surfaces of the housing, the slinger 88 that reaches below the fluid level is mounted onto the motor shaft 15. And the nut 89 clamps the pinion 17, slinger 88 and the inner race of the bearing 31 against a shoulder on the motor shaft as shown, so that they all rotate as a unit with said shaft, as is a common practice in speed change transmissions, wherein portion of its rotating parts extend below the fluid level, so that centrifugally the fluid is splashed about so as to wet the surfaces that are inclosed within the housing. Then the fluid flowing back by gravity, so that the process is repeated continuously. The multiplicity of arrowed lines 90 indicate generally the fluid flowing back and wetting external portions of the prime mover 10, that as heretofore dwelt with is inclosed within the housing 100, with its lower portion extending into the fluid. And referring to the Figure 2, the fluid being thrown from the rotating parts of the speed change mechanism onto the inside walls of the enlarged portion of the housing, parts of which will flow back along the surface of the vertical wall 91, see Figure 1, and as the top walls of the cover extension 58 where they intersect the vertical of the wall 91 slope toward the center of the prime mover, see Figure 2, and in longitudinal direction, see Figure 1, they slope downwardly toward the front end, the combination of molecular attraction and gravity forces causing said fluid following these slopes and continuously falling off onto the exposed surfaces of the prime mover. Which effects cooling of the prime mover by the fluid transferring the heat generated by the prime mover to the housing, which has greater surface area so as to permit of dissipation of said transferred heat to the atmosphere in an ordinary manner. Also conventional fins may be included to increase the area of the exposed surfaces, altho they are not illustrated.

And a further means of effecting transfer of the heat operably generated by the prime mover, the prime mover shaft 15 may be made hollow as is indicated by dotted lines 92, see Figure 1, and a trough 93 provided on the inside wall of the body portion 45, the trough 93 having an end of a pipe nipple 94 fastened thereto and extending through a wall of said trough, with its other end extending into the hollow 92, so that as the fluid flowing downwardly as at 90A, into the trough thence through the nipple 94 and the hollow 92, thence spilling into the fluid pool outside of the prime mover.

In electric motor practice, the feature of its operably generating heat is wellknown, therefore detail matter concerning same are here omitted.

It is realized that were the power takeoff shaft Figure 1, made solid in place of hollow, same would readily permit of correspondingly condense its journal support and the device. For were the power takeoff shaft made solid, in place of tubular, the external diameter would then be reduced, which permits of its bearings and their support means being of smaller size and thereby compact dimensionally various portions of the device so constructed.

The modified form Figures 4, 6 and 8–9 of the device and features are generally similar to that of the device Figure 1, with the exception that its power takeoff 29' is not tubular in the sense of that heretofore described, and the fluidtight housing 100' is shown as being composed of four parts. A rear cover 45", a body portion 45', a cover section 57' having the extension 58' and a front cover 57". They are all suitably fitted and fastened together to form a single unit. The fastenings are not shown. The body portion 45' has a hub 52' in line with a hub 52" on the rear cover 45" which together are bored for the outer races of the bearings 53' and 54', that in turn form the journalling support for the power takeoff 29'. The inner race of the bearing 53' is positioned between a shoulder and a snap ring 56' on the power takeoff shaft, while the outer race of this bearing abuts a snap ring 56" in the hub 52' prevents the power takeoff moving toward the prime mover shaft 15. Then the cover cap 48' which is suitably fitted and fastened to the end of the hub, averts excessive movement of said power takeoff in the opposite direction. The rear cover 45" includes the hub 96 which is in line with a hub 52A' on the cover section 57' and they are both bored for the outer races of the bearings 84 and 85, that form the journaling support for the intermediate shaft 19. The extension 58' of the cover section 57' has two rows of bosses 59', the rear row and the front end of the extension being bored to position and center the prime mover 10 within the housing 100'. And the rear row are also drilled for the screws 28, for fastening the prime mover in desired position as is hereinafter described. The front and rear end brackets 26' and 26A' include externally bosses 59A' and are correspondingly machined for purpose above mentioned. Essentially the prime mover 10 and its fittings are the same as had been heretofore described, with the exception that it is shown turned forty-five degrees. And in line with the opening 36, the extension 58' has four bosses 59B, spaced at ninety degrees apart, only two of which are shown, see Figure 8, and as heretofore each of these bosses internally have pipe threads for application of the threaded shank of the combined coupler unit, heretofore dwelt with.

The body portion 45' includes the support base 80', that may be mounted onto a portion of the driven machinery or foundation in different positions, such as is commonly referred to as floor, wall or ceiling. The device as shown Figures 8 and 9, would then be considered as being floor mounted, and the fluid medium level then would be as represented by the dash line 87 and the vertical dot and dash line 5 becomes the vertical center line, and as shown the boss 59B, that is then on top of the extension 58' with the combined coupler unit operably assembled thereto, or one-hundred-eighty degrees opposite the base. The other three bosses 59B, having a plug 59C, as shown at the bottom of the extension Figure 8. Then on the other hand, were it considered that the device mounted, wall mounting, the fluid medium level then would be as represented by the dash line 87' and the conduit pipe 39 would then project through a similar boss 59B, that is spaced ninety degrees from that of the base, so that said coupler unit be assembled at the top. Then further were it considered that the device be mounted, ceiling mounting, the fluid medium level then would be as represented by the dash line 87", said conduit pipe then would project through the boss 59B, that is on the same side as that of the base, again so that the assembled coupler unit be at the top.

The above is readily accomplished as the screws 28 are spaced accordingly so that the prime mover be assembled into the housing 100' so that the opening 36 in the frame 25 be in a corresponding desired top position. And to facilitate such matters the front cover 57", the conduit pipe 39 and the coupler unit are made removable. Then further to correspond, no matter which side of the extension 58' happens to be on top, they all are sloped so as to direct the flow of the fluid medium toward the exposed external surfaces of the prime mover as hereinabove dwelt with. And operably to further cause the fluid medium being splashed onto the wall 91', see Figure 8, at the intermediate speed shaft 19, in adjacency to the slow speed pinion 20 have included an auxiliary slinger 97 having a cone shaped form that terminates on the side of the intermediate gear 18. And this gear may be provided with a series of holes as at 98', through which the fluid medium flows as it is thrown off of the slinger 97 and due to consequent centrifugal force is thrown onto the wall 91. This is feasible as the power takeoff gear 21 dips below the surface of the fluid medium and even tho it operates at low speed it lifts a portion of the fluid so that when its teeth mesh with those of the pinion 20, same is forced out sideways onto the sloping side of the slinger 97 and thrown onto the side of said intermediate gear.

The present development also provides means so that the fluid medium may be directed so as to flow through the hollow 92 of the prime mover shaft 15, which consists of a pair of lifters 99 mounted at the power takeoff and radially it reaches into the fluid medium. And operably, as the power takeoff rotates lifts said fluid, see Figure 4, to a height so that it flows into the hollow 98 in the power takeoff, whence as heretofore, flows through the pipe nipple 94 having one end fastened to the other end of the hollow 98, thence extending into the hollow of the power takeoff.

In place of or in conjunction with the slinger, the gearing means and the other rotating parts within the housing forms the splash means to circulate the fluid medium, therefore this matter operably does not entail power consumption over that of common practice heretofore applied, but the matter of forcing air circulation to form a major cooling means for the prime mover causes power consumption, which is but one of the advantages of this development, the prime mover being inclosed within the housing so that its cooling means does not rely upon being drawn from the outside, for its major cooling means is the circulation of the fluid, which as above mentioned does not entail additional power consumption. And it is well established matter that a fluid is the more efficient medium in effecting heat transference, therefore less volume is required. Consequently as the prime mover application eliminates outside air circulation apparatus, saves in length of the overhang and its consequent overhang weight beyond the support. Additionally having the prime mover inclosed within the housing saves closure parts thereof the prime mover, also it does not entail extra costs and operating expense, and is heretofore the situation in gearmotor units, that when externally an inclosed type motor is included as the prime mover of the gearmotor unit, same materially increases its costs and in which in most instances involves matters concerning greater operable temperature rise. Then the development readily permits using the most suitable metals and their weights for the prime mover closure, so as to obtain the most efficient heat conductance situations.

Various changes may be made in the embodiment of the invention hereinabove specifically described without departing from or sacrificing the advantages of the invention as defined in the appended claims.

I claim:

1. A speed change transmission comprising, a prime mover, said prime mover having a fluidtight closure and a power output shaft, the external portions of said closure forming a radiate surface, a speed change mechanism, said speed change mechanism having a power takeoff shaft, a fluidtight housing, said housing having walls confining a fluid medium within the housing along with an external support adapted to be secured to a foundation, said prime mover together with said speed change mechanism being operably mounted within said housing contactable with said fluid medium while said speed change mechanism forms the speed change means between said power output shaft and said power takeoff shaft, and operably said speed change mechanism providing rotating portions which forms means for throwing portion of said fluid medium against inner surface portion of said housing, transferable heat being generated by said prime mover, in which said fluid medium forms a major medium of heat conveyance means to transfer said heat from said radiate surface to the walls of said housing, part of said walls being sloped toward a top central portion of said closure of said prime mover within said housing, and said power takeoff shaft extending from said housing.

2. A speed change transmission comprising, a leadin conduit nipple, a combined closure coupler, said coupler having a shielded vent, a prime mover, said prime mover having a fluidtight closure and a power output shaft along with a leadin conduit aperture, the external portions of said closure forming a radiate surface, a speed change mechanism, said speed change mechanism having a power takeoff shaft, a fluidtight housing, said housing having walls confining a fluid medium within the housing along with an external support adapted to be secured to a foundation and a leadin conduit opening, said prime mover together with said speed change mechanism being operably mounted within said housing contactable with said fluid medium while said speed change mechanism forms the speed change means between said power output shaft and said power takeoff shaft, and operably said speed change mechanism providing rotating portions which forms means for throwing portion of said fluid medium against inner surface portion of said housing, said nipple being secured fluidtight to said aperture while extending through said opening, said coupler forming a fluidtight seal about an external perimeter of said nipple and simultaneously fluidtight sealing of said opening without impairing its shielded vent, said vent providing means of communicating the interior of said housing with the atmosphere, transferable heat being generated by said prime mover, in which said fluid medium forms a major medium of heat conveyance means to transfer said heat from said radiate surface to the walls of said housing, part of said walls being sloped toward a top central portion of said closure of said prime mover within said housing, and said power takeoff shaft extending from said housing.

3. A speed change transmission comprising, a prime mover, said prime mover having a fluidtight closure and a hollow power output shaft, said hollow of said power output shaft together with the external of said closure forming radiate surfaces, a speed change mechanism, said speed change mechanism having a power takeoff shaft, a fluidtight housing, said housing having walls confining a fluid medium within the housing along with an external support adapted to be secured to a foundation, said prime mover together with said speed change mechanism being operably mounted within said housing contactable with said fluid medium while said speed change mechanism forms the speed change means between said power output shaft and said power takeoff shaft, and operably said speed change mechanism providing rotating portions which forms means for throwing portion of said fluid medium against inner surface portion of said housing, transferable heat being generated by said prime mover, in which said fluid medium forms a major medium of heat conveyance means to transfer said heat from said radiate surfaces to the walls of said housing, part of said walls being sloped toward a top central portion of said closure of said prime mover within said housing, and said power takeoff shaft extending from said housing.

4. A speed change transmission comprising, a driven shaft, a journal support for said driven shaft, a prime mover and a speed change mechanism operably coupled to form a speed change device, said mechanism having a power takeoff shaft including its bearing support, coupling means to connect said takeoff shaft about a portion of said driven shaft, a combined universal self-aligning support and tiltable torque resisting means for said device including, a support element, said support element extending from said device, a spherical portion externally on said support element, a cover for said spherical portion formed of a bottom half adapted to be secured to a foundation, a top half and, interconnecting means, axially said interconnecting means extending transversely relative to the longitudinal axis of said takeoff shaft so as to fasten said top half onto said bottom half as a unit, said unit internally having a spherical part correspondingly formed for adjustable surface engagement with said spherical portion for supporting said support element, said spherical portion being coaxial with said axis, slot means, said slot means having a side extending parallel to said axis and intersecting portion of said surface engagement so that a side of said interconnecting means adjustably engages therewith to form said tiltable torque resisting means between said support element and said unit, the pivotal and tilting axes of said surface engagement intersecting the center of said spherical portion so as to permit said rigidly coupled driven shaft being journalled by said bearing support to provide said journal support to substantially resist angular movement of said device with and relatively to said takeoff shaft, said device having a fluidtight housing with said prime mover and said mechanism mounted therein operably contactable with a fluid medium within said housing, said fluid medium to provide means for simultaneously wetting surface portions of said housing and revolving portion of said mechanism together with external portions of said prime mover by said revolving portions causing said fluid being thrown against and about the inner portion of said housing.

5. A speed change transmission comprising, a prime mover, said prime mover having a fluidtight closure and a power output shaft, a speed change mechanism, said speed change mechanism having a power takeoff shaft, a fluidtight housing, said housing having walls confining a fluid medium within the housing and extending externally a support element, a spherical portion on said support element coaxial with the lonigtudinal axis of said power takeoff shaft, a cover for said spherical portion formed of a bottom half adapted to be secured to a foundation, a top half and, interconnecting means extending transversely relative to said axis so as to fasten said top half onto said bottom half as a unit, said unit internally having a spherical part correspondingly formed for adjustable surface engagement with said spherical portion for supporting said support element, slot means, said slot means having a side parallel to said axis and intersecting portions of said surface engagement so that a side of said interconnecting means adjustably engages therewith to form a tiltable torque resisting means between said support element and said unit, said prime mover together with said speed change mechanism being operably mounted within said housing in contact with said fluid medium while said mechanism forms the speed change means between said shafts, operably transferable heat being generated by said prime mover and said speed change mechanism having rotating portions which forms means for throwing portion of said fluid medium against inner surface portion of said housing so that said fluid medium forms a major medium of heat conveyance means to transfer said heat from said closure to said housing, the pivotal and tilting axes of said surface engagement intersecting the center of said spherical portion so as to permit of said unit being mounted onto the foundation and substantially resist angular movement of said housing with and relatively to said takeoff shaft.

6. A speed change transmission comprising, a prime mover, said prime mover having a fluidtight closure and a power output shaft extending therefrom, the external portions of said closure forming a radiate surface, a speed change mechanism, said speed change mechanism having a power takeoff shaft and revolving portions, a fluidtight housing, a fluid medium within said housing, said prime mover together with said speed change mechanism being operably mounted within said housing with portion of said revolving portions in contact with said fluid while said mechanism forms the speed change means between said power output and takeoff shafts, and operably said portion forming means for splashing said fluid medium against and about inner surface portions of said housing so as to cause wetting of said closure together with said revolving portions, transferable heat being generated by said prime mover, in which said fluid medium forms a major medium of heat conveyance means to transfer said heat from said radiate surface to walls of said housing, part of said walls being sloped toward a top central portion of said closure so as to permit of the fluid flowing from said inner surface portions onto said surface, and said power takeoff shaft extending from said housing.

References Cited in the file of this patent

UNITED STATES PATENTS

| | | |
|---|---|---|
| 2,453,449 | Melcher | Nov. 9, 1948 |
| 2,603,983 | Rieser | July 22, 1952 |